Dec. 24, 1946.   F. WALLER ET AL   2,413,269
METHOD OF PROJECTING MOTION PICTURES
Filed Feb. 1, 1944   6 Sheets-Sheet 1

INVENTOR.

Dec. 24, 1946.  F. WALLER ET AL  2,413,269
METHOD OF PROJECTING MOTION PICTURES
Filed Feb. 1, 1944  6 Sheets-Sheet 3

Dec. 24, 1946.  F. WALLER ET AL  2,413,269
METHOD OF PROJECTING MOTION PICTURES
Filed Feb. 1, 1944  6 Sheets-Sheet 6

INVENTOR.
Fred Waller
BY Willis Robert Dresser
Emery, Varney, Whittemore & Dix

Patented Dec. 24, 1946

2,413,269

UNITED STATES PATENT OFFICE 2,413,269

METHOD OF PROJECTING MOTION PICTURES

Fred Waller, Huntington, N. Y., and Willis Robert Dresser, Long Hill, Conn., assignors to The Vitarama Corporation, Huntington Station, N. Y., a corporation of New York Application February 1, 1944, Serial No. 520,592

10 Claims. (Cl. 88—16.8)

This invention relates to methods of projecting motion pictures and has as an object the provision of what may be called a scanning method of projection in which a beam of light is caused to move progressively across the area of the film frame being projected, so as to illuminate the film frame progressively to project an image in successive increments across the screen, and in which the film is advanced continuously (non-intermittently), with the movement of the beam of light so coordinated with the continuous movement of the film that each successive image is projected onto the screen as a stationary image.

The invention is particularly applicable to panoramic or wide angle projection in which it is desired to project an image onto a concave curved screen, as for example a cylindrical or spherical screen and in which it is desired to project an image over a wide arc of said screen, say 90° or more in the horizontal plane, and over any suitable arc in the vertical plane. In such panoramic or wide angle projection it is evident that relatively large film image frames would be required for projection by ordinary methods, thus requiring an extraordinarily high rate of movement of the film, and another object of the invention, therefore, is to provide for an expansion of the film image lengthwise of the screen whereby the size of the film frames may be reduced and the rate of movement of the film kept within convenient limits.

Other objects and advantages of the invention will appear hereinafter.

Figure 1:
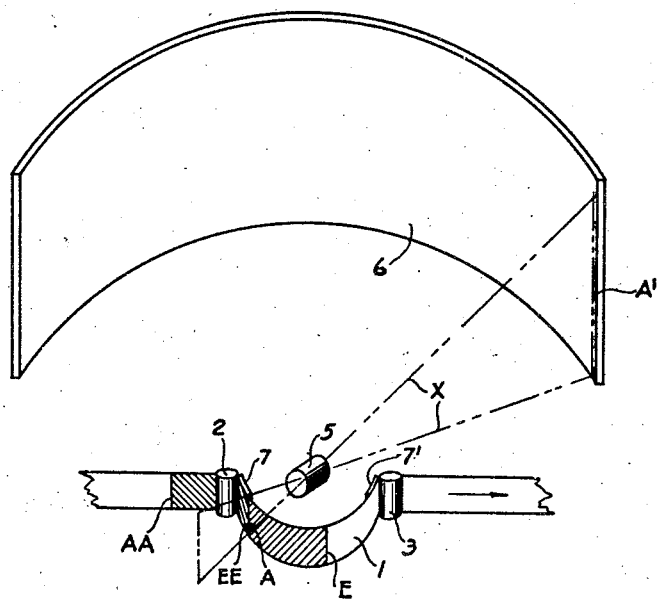

A preferred embodiment of the invention selected for purposes of illustration is shown in the accompanying drawings, in which, Figure 1 is a perspective diagrammatic view.

Figures 2 to 8 inclusive are plan diagrammatic views.

Figure 9:
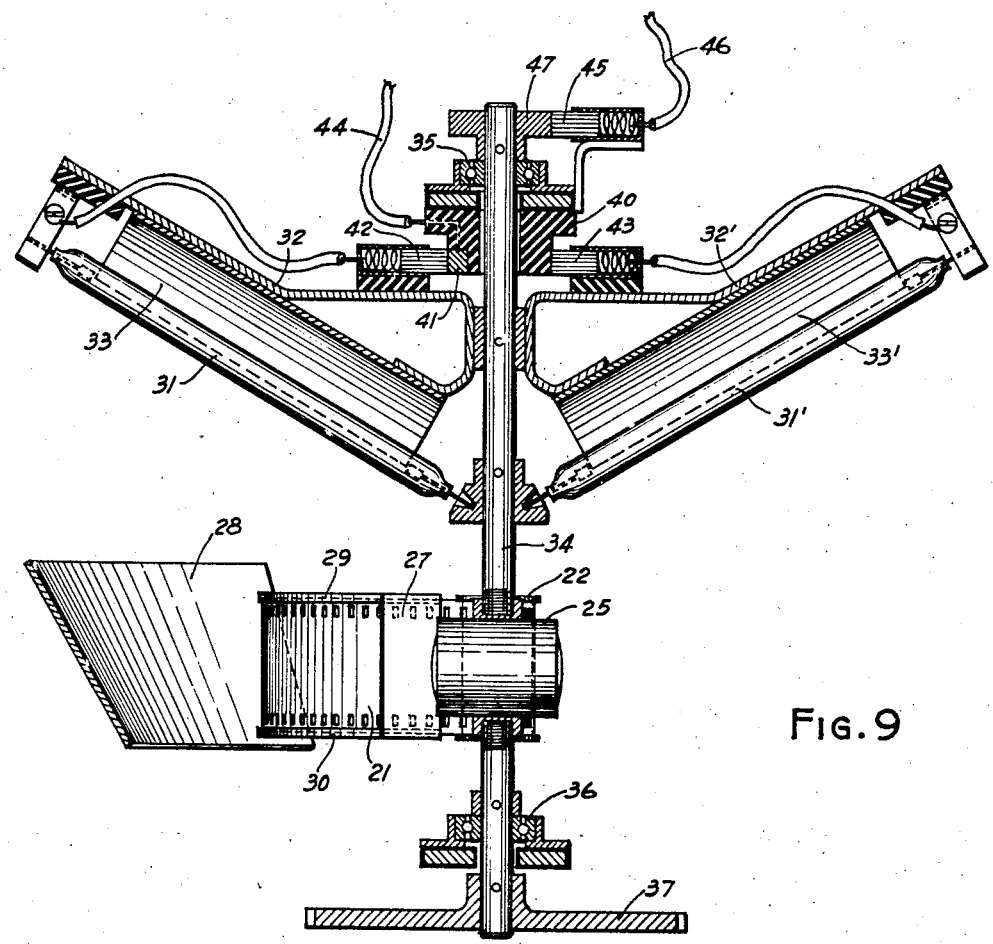
Figure 10:
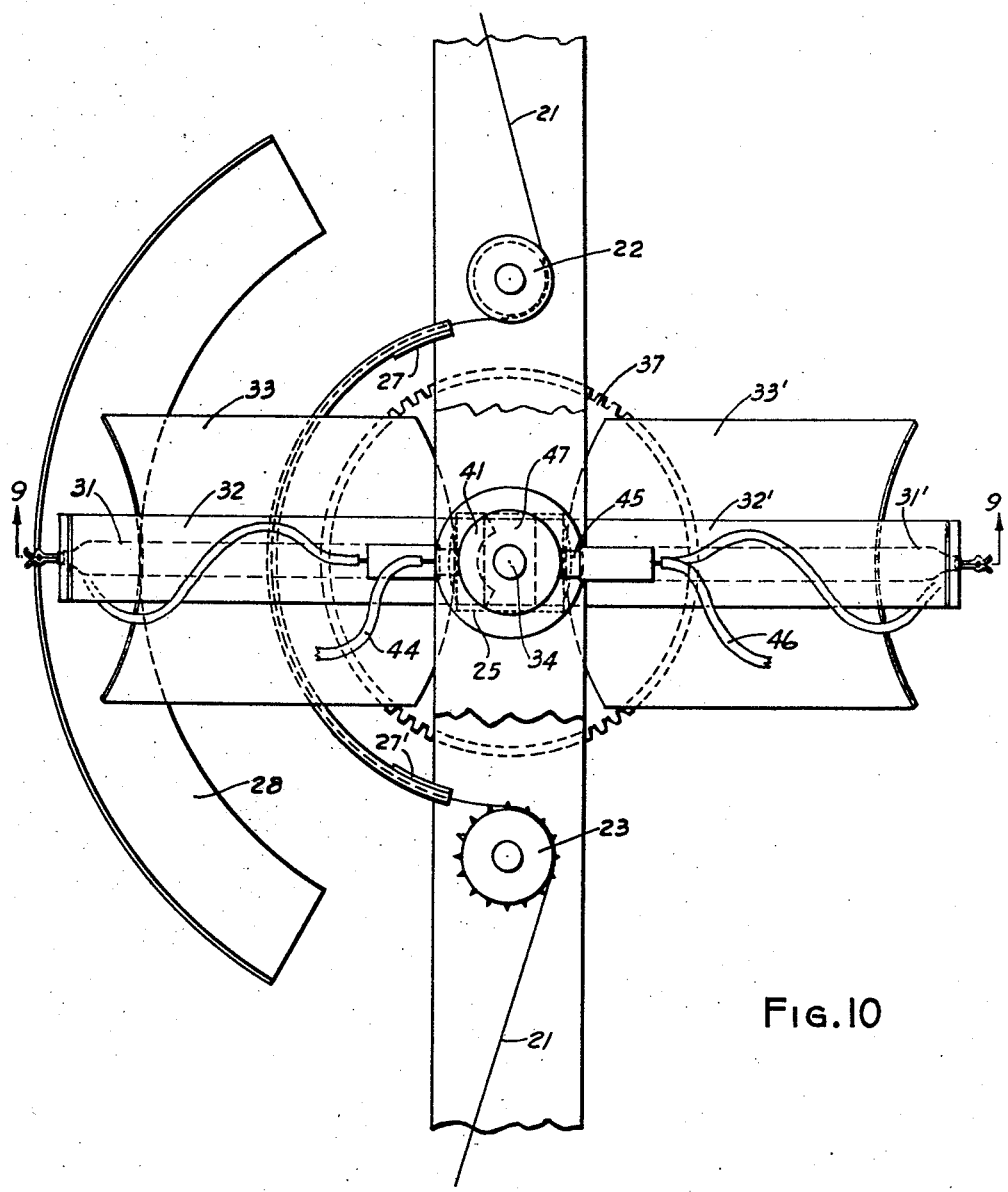

Figure 9 is a vertical section on the line 9—9 of Figure 10 showing apparatus for practicing the method of the invention, and Figure 10 is a top plan view.

According to the present invention the film to be projected is fed continuously (not-intermittently) through a curved gate or other suitable curved film guide means adapted to hold the portion of the film to be projected in cylindrical shape. Normally, unless optical corrective means are provided, the center of curvature of the gate should coincide with the center of curvature of the screen, and in such case, the gate will be provided with an aperture covering an arc substantially equal to the arc of the projection area of the curved screen on which the pictures are to be projected. Theoretically, the method is adapted to projection through a gate aperture of 180°, or even more, but in practice, it is seldom desirable to project over an arc exceeding 180°, and due to mechanical limitations, and particularly to interference with the projection beam by the film guiding and feeding means located at the ends of the gate, the usual gate aperture is somewhat less, as for example, between 90° and 150°. It will be understood, of course, that in the following description we use the term "aperture" in a broad sense to refer to the space through which the light beam is allowed to pass through the film for projection purposes. In the following description, we shall assume a typical gate aperture covering 120° of arc, and a cylindrical screen area of like extent.

The light passing through the film and gate aperture to project the film image onto the screen is preferably in the form of a relatively narrow beam lengthwise of the film, i. e. in the direction of movement thereof, but extends transversely across the full width of the film. Suitable means such as reflectors, lenses or masks are provided for concentrating light emanating from a light source into a beam of this form. Such a beam is rotated to move along the film in the same direction that the film is moved through the gate, but at an angular velocity greater than the angular velocity of the film in the gate.

A single beam or a plurality of such beams may be employed to scan successive film frames as hereinafter explained, and for each such beam, a suitable optical lens system is provided, rotating with its respective beam, to pick up and focus on the screen the light passing through said film.

In practice, in order to project a stationary image onto the screen from the continuously moving film, certain relationships must be observed between the angular velocity of the film through the gate, the angular velocity of the light beam, the extent of arc of the gate aperture and the angular distance between successive film frame centers when held in the curved gate. If we represent the angular velocity of the film through the gate by $V^f$, the angular velocity of the light beam by $V^b$, the arc of the gate aperture by $A$ and the angular distance between successive frame centers by $F$, such relationships may be expressed by the formula $$\frac{V^b}{V^f} = \frac{A}{A-F}$$

The linear distance between successive frame centers can be readily calculated, of course, for a curved gate of any given radius.

Furthermore, the spacing between successive light beams must be properly related to the other factors as above described. If we represent the angular distance between successive light beam centers by $D$, such relationship may be expressed by the formula $$D = F\frac{A}{A-F}$$

or
$$D = F\frac{V^b}{V^f}$$

Applying these formulas to specific conditions, it will be seen that if the gate aperture extends through an arc of 120° and the successive film frames are spaced at 60° between centers when held in the curved gate, the ratio of light beam velocity to film velocity will be two to one, and successive light beams should be spaced 120° apart. If the gate aperture remains 120°, but the film frames are spaced at 90° between centers, the ratio of light beam velocity to film velocity will be four to one, and successive light beams should be spaced 360° apart. Likewise, if the gate aperture remains 120° but the film frames are spaced at 30° between centers, the ratio of light beam velocity to film velocity will be four to three and successive light beams should be spaced 40° apart.

In practice, bearing in mind that the successive light beams are picked up and focused by suitable optical lens systems rotating with the respective light beams, it is advisable to select factors such that the required angular distance between successive light beam centers is either 360° or equally divisible into 360°, as 30°, 40°, 60°, 90°, 120°, or 180° for example, in order to avoid mechanical complications. In such case the means for moving the light beams and the lens holder for the optical lens systems may be mounted to rotate on an axis concentric with the axis of the curved gate, with successive light beams and successive optical lens systems equally spaced about said axis. In fact, a single lens system may be used reversibly to focus two beams spaced at 180°.

Thus, in the specific embodiment of the invention illustrated in the drawings, the gate aperture and projection area of the screen are shown as arcs of 120° and the successive film frames are spaced 72° between centers. This provides a ratio of light beam velocity to film velocity of five to two and successive light beams should be spaced 180° apart.

Under these conditions, with the beams moving faster than the film each beam will scan one entire frame length of film in the gate while the beam is moving the entire length of the gate aperture. For example, assuming the film at a position where the trailing edge of a given frame of film is in line with the entrance edge of the gate aperture and in line with the center of the beam of light, since the film frame occupies 72° of the gate aperture, it needs to move only 48° to bring its leading edge into line with the exit edge of the gate aperture. Accordingly if the light beam moves at a rate bearing a ratio of five to two to the rate of movement of the film, it will be apparent that by the time the film has moved 48° the light beam will have moved 120°, thus scanning the entire length of one film frame during such movement and projecting the image of said film frame progressively in successive increments across the 120° projection area of the screen. Thus the 72° image of the film frame has been expanded over 120° of arc of the screen.

The image so projected onto the screen will appear thereon as a stationary image despite the continuous motion of the film and the continuous motion of the beam of light, as will appear from consideration of the diagrams of Figures 1 to 8 inclusive. In the diagram of Figure 1, the elements essential for projection according to the method of the invention are shown in perspective, while in Figures 2 to 8 inclusive, these elements are shown in plan view illustrating successive stages of projection of a picture image frame. The elements shown in Figure 1 are in the same relative positions as in Figure 2, and in both figures, such elements are shown in position to begin the projection of a film image frame.

In Figures 1 to 8, the film strip is designated by 1. Said film passes over a guide roller 2 and over a feed sprocket 3 adapted to feed the film strip continuously at a constant rate. Between the guide roller 2 and the feed sprocket 3, the film strip passes through a curved gate (not shown structurally in these figures) which holds the portion of the film to be projected in cylindrical form, with the axis of the cylinder coinciding with the axis of rotation 4 of the lens holder 5 containing a suitable optical lens system for focusing the projection beam on the concave surface of the curved screen 6. In the embodiment illustrated, the screen 6 is shown as having a cylindrical surface, and the axis of the cylinder also coincides with the center of rotation 4 of the lens holder 5. The gate aperture is indicated diagrammatically by the space between the members 7 and 7', which may be assumed to constitute the ends of the gate, and the annular aperture of the gate is assumed to be 120°. Consequently, as illustrated, the arc of the projection screen 6 is also assumed to be 120°.

The first film image frame to be projected lies between the lines A and E, and the second film image frame to be projected lies between the lines AA and EE, the latter of which coincides with the line A, as shown. For convenience, these two film image frames have been cross-hatched in opposite directions on the drawings so that they may be readily distinguishable.

Figure 2:
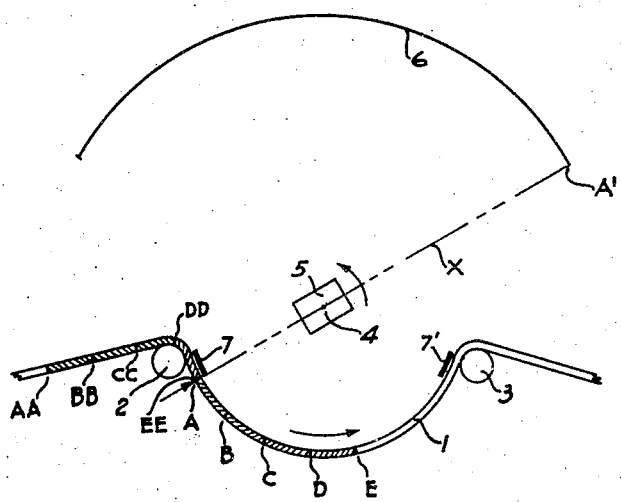

As previously stated, Figures 1 and 2 illustrate the positions of the elements at the beginning of projection of film image frame A—E, and it will be observed that the trailing edge A of said frame is in line with the entrance edge of the gate aperture, and the leading edge E of said frame is spaced 72° from the trailing edge. The entire area of the first frame, therefore, is exposed to the gate aperture. At this stage, the beam of light X used for projection purposes, and which is represented in Figures 1 to 8 by dot-dash construction lines, is in position to project through the trailing edge A of the first frame. Therefore, the light passing through the portion of the film image at this edge of the frame is received by the optical lens system in the lens holder 5, and is focused thereby on the screen A'.

Figure 3:
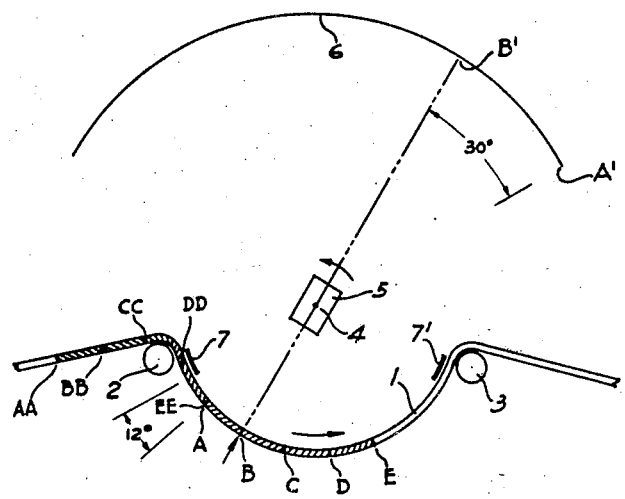

In Figure 3, the beam of light and the lens holder are assumed to have rotated through an angle of 30°, and bearing in mind that in the example selected for purposes of illustration, the ratio of the angular velocity of the beam to the angular velocity of the film in the gate is assumed to be 5 to 2, it will be seen that the film will have advanced 12° during such movement of the light beam. Therefore, while progressing from the position of Figure 2 to the position of Figure 3, the light beam will have scanned 18° of arc of the film frame, and will, at the stage illustrated in Figure 3, be projecting through the region B of the image to form a projected image in the region B' of the screen. In the meantime, the film image within the area between A and B which has been scanned by the beam of light will have been projected onto the screen area between A' and B'.

Figure 4:
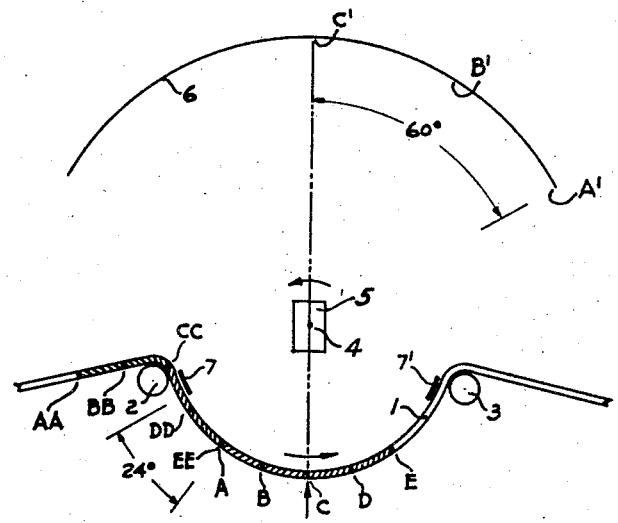
Figure 5:
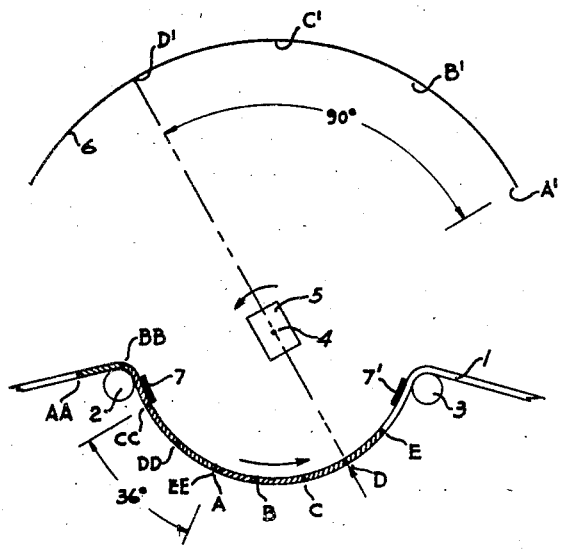
Figure 6:
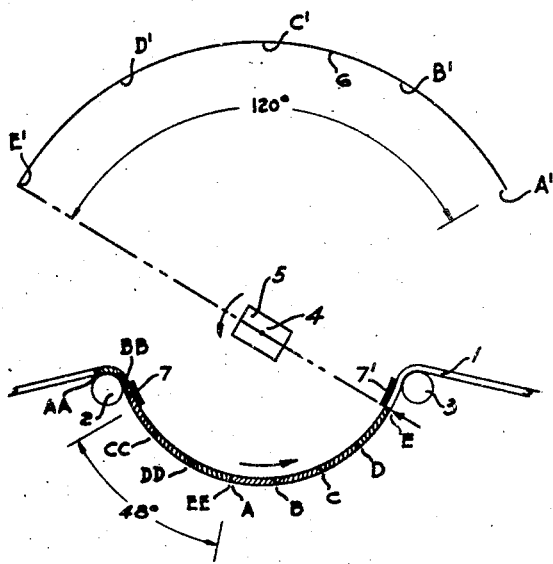

In Figures 4, 5 and 6, the beam of light and the lens holder are assumed to have moved through additional increments of 30° in each case, with the film moving 12° in each case, so that 18° of the film frame is scanned in each case to project images onto the screen areas lying between B'—C' and C'—D' and D'—E', respectively. Thus, by the time the beam of light has moved through 120° to reach the end of the gate aperture, it has scanned 72° of the frame, or the entire length of the frame, and has spread a projected image progressively in successive increments across 120° of arc of the screen. However, by using a narrow beam of light, each successive increment is perceived by the eye of the observer as a stationary increment, and the image as a whole is perceived as a stationary image.

Figure 7:
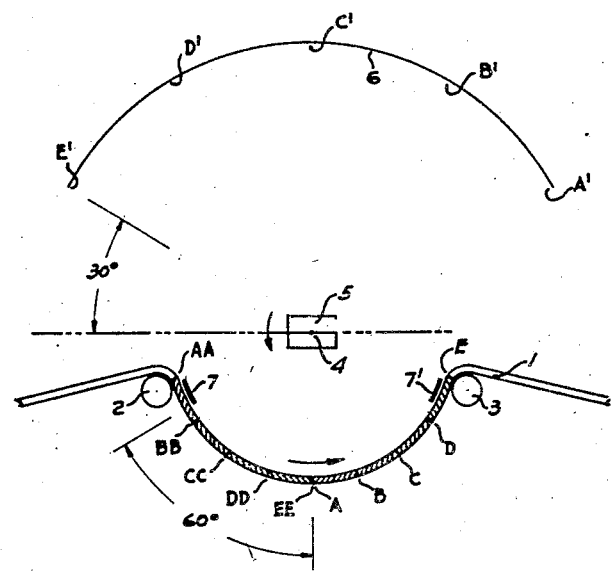
Figure 8:
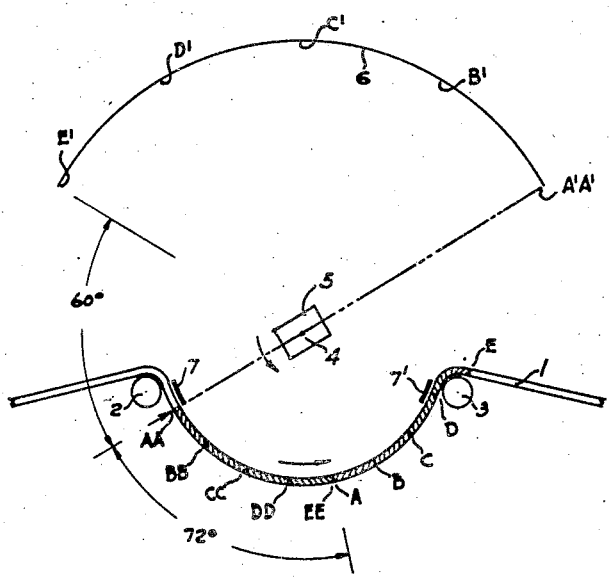

At the stage shown in Figure 6, therefore, the projection of the first frame has been completed, but according to the formula previously given, the next successive light beam used for projection purposes should be spaced at 180° from the preceding beam. Therefore, there should be an interval of 60° as measured by the rotation of the lens holder before the projection of the next successive frame can begin. The necessity for this interval under the conditions assumed will be apparent from Figure 6, for although the projection of the first frame has been completed, the second frame is not yet in position for projection to begin, as its trailing edge AA has not yet reached the entrance end of the gate aperture. Motion of the film is continued during this interval, therefore, as indicated in Figure 7 where the lens holder has moved an additional 30°, while the film has moved an additional 12°. In Figure 8, the lens holder has again moved an additional 30° and the film has moved an additional 12°, thus causing the second frame AA—EE to occupy the same position as the first frame occupied in Figure 2. Therefore, a second beam of light, as indicated at X' moves into projection position with the lens holder and the projection process is repeated as before.

In the embodiment illustrated, the optical lens system contained in the lens holder is assumed to be reversible so that the same optical lens system may be used to focus the successive beams onto the screen. In order to provide a flickerless image on the screen, the light beam and the lens holder should be rotated at a rate such as to project forty-eight or more images onto the screen per second.

A more detailed illustration of apparatus for carrying out the method of the invention is illustrated in Figures 9 and 10. As illustrated, the film 21 passes over the guide roller 22 and feed sprocket 23 adapted to be rotated continuously to feed the film continuously at a constant rate. Between the guide roller and the feed sprocket, the film passes through a curved gate consisting of upper and lower guide channels 29 and 30 having a 120° aperture therein between the supports 27 and 27' at the ends thereof. Illumination for projection purposes is furnished by a pair of tubes 31, 31' mounted in suitable holders 32, 32' and having reflectors 33, 33' adapted to concentrate the light emanating from said tubes into a relatively narrow beam which is directed toward a conical reflector 28, and from said reflector through the film and gate aperture. As illustrated, the tubes 31, 31' and their holders and reflectors are mounted on a shaft 34 supported for rotation in bearings 35 and 36. Said shaft also carries a lens holder 25 containing a suitable optical lens system as previously described. A suitable gear 37 is mounted on said shaft to rotate the same in timed relation with the rotation of the feed sprocket to provide the 5 to 2 ratio hereinbefore referred to, or any other desired ratio depending upon the conditions desired. The axis of rotation of the shaft 34 coincides with the axis of curvature of the gate and with the axis of the conical reflector.

Since each of the tubes is used to provide a projection beam during only a portion of each complete rotation, a commutator 40 may be provided having a conducting segment 41 adapted to be engaged by brushes 42 and 43 mounted on the respective tube holders and connected to the respective tubes. A suitable lead 44 is provided to the conducting segment, and a third brush 45, connected to lead 46, operates against a bushing 47 on the end of the shaft. By this arrangement, and by adjusting the length of the conducting segment as desired, the tubes may be illuminated only when they are in projecting position.

In the foregoing description, it will be understood that the expansion of the projected image on the screen, as previously described, will result in a distortion of a film image photographed in the normal manner. Such distortion may be corrected, however, either by condensing the image when photographing the same or in transferring from negative to positive for projection purposes.

It will be understood that the invention may be variously modified and embodied within the scope of the subjoined claims.

We claim as our invention:

1. The method of projecting a stationary picture image onto a screen which comprises continuously advancing a film having a picture image frame thereon through a curved gate having an aperture longer than said frame, and projecting a beam of light which is shorter than said frame through said frame and aperture to project an elemental part of the film image while rotating said beam on an axis concentric with the axis of curvature of the film in the gate at an angular velocity sufficiently greater than the angular velocity of the film in the gate to cause said beam to scan the full length of said frame while traversing the full length of said aperture.

2. The method of projecting a stationary picture image onto a screen which comprises continuously advancing a film having a picture image frame thereon through a curved gate having an aperture longer than said frame, and projecting a beam of light which is shorter than said frame through said frame and aperture to project an elemental part of the film image while rotating said beam on an axis concentric with the axis of curvature of the film in the gate at an angular velocity sufficiently greater than the angular velocity of the film in the gate to cause said beam to scan the full length of said frame while traversing the full length of said aperture and coordinating the movement of the beam of light with the movement of the film to cause the beam of light to project through the center of the film frame at the center of said aperture.

3. The method of projecting a stationary picture image onto a screen which comprises continuously advancing a film having a picture image frame thereon through a curved gate having an aperture longer than said frame, and projecting a beam of light which is shorter than said frame through said frame and aperture to project an elemental part of the film image while rotating said beam on an axis concentric with the axis of curvature of the film in the gate and coordinating the movement of the beam of light with the movement of the film to cause the beam of light to project through the trailing edge of said frame at the entrance end of said aperture, through the center of said frame at the center of said aperture and through the advancing edge of said frame at the exit edge of said aperture.

4. The method of projecting a stationary picture image onto a screen which comprises continuously advancing a film having a picture image frame thereon through a curved gate having an aperture longer than said frame, and projecting a beam of light which is shorter than said frame through said frame and aperture to project an elemental part of the film image while rotating said beam on an axis concentric with the axis of curvature of the film in the gate at an angular velocity sufficiently greater than the angular velocity of the film in the gate to cause said beam to scan the full length of said frame while traversing the full length of said aperture and rotating an optical lens system in line with said beam of light to focus the image scanned by said beam of light onto a curved screen, said optical lens system being aligned with the trailing end of a frame at the entrance end of said gate aperture to begin projection of said frame, and being aligned with the advancing end of said frame at the exit end of said gate aperture to complete the projection.

5. The method of projecting motion pictures which comprises continuously advancing a film having a series of picture image frames thereon through a curved gate having an aperture longer than the distance between successive picture image frame centers, and projecting a beam of light which is shorter than said frame through said film and aperture to project an elemental part of the film image while rotating said beam of light on an axis concentric with the axis of curvature of the film in the gate at an angular velocity greater than the angular velocity of the film in the gate to cause said beam of light to scan successive frames.

6. The method of projecting motion pictures which comprises continuously advancing a film having a series of picture image frames thereon through a curved gate having an aperture longer than the distance between successive picture image frame centers, projecting a beam of light which is shorter than said frame through said film and aperture to project an elemental part of the film image while rotating said beam of light on an axis concentric with the axis of curvature of the film in the gate at an angular velocity greater than the angular velocity of the film in the gate to cause said beam of light to scan successive frames and coordinating the movement of the beam of light with the movement of the film to cause the beam of light to project through the center of successive film frames at the center of said gate.

7. The method of projecting motion pictures which comprises continuously advancing a film having a series of picture image frames thereon through a curved gate having an aperture longer than the distance between successive picture image frame centers, projecting a beam of light which is shorter than said frame through said film and aperture to project an elemental part of the film image while rotating said beam of light on an axis concentric with the axis of curvature of the film in the gate at an angular velocity greater than the angular velocity of the film in the gate to cause said beam of light to scan successive frames and maintaining the ratio of the angular velocity of the beam of light to the angular velocity of said film equal to the ratio of the arc of said aperture to the arc of said aperture minus the angular distance between centers of successive film frames in said gate.

8. The method of projecting motion pictures which comprises continuously advancing a film having a series of picture image frames thereon through a curved gate having an aperture longer than the distance between successive picture image frame centers, projecting a beam of light which is shorter than said frame through said film and aperture to project an elemental part of the film image while rotating said beam of light on an axis concentric with the axis of curvature of the film in the gate at an angular velocity greater than the angular velocity of the film in the gate to cause said beam of light to scan successive frames and rotating an optical lens system in line with said beam of light to focus the image of each frame scanned by said beam of light onto a curved screen, said optical lens system being aligned with the trailing end of a frame at the entrance end of said gate aperture to begin projection of said frame, and being aligned with the advancing end of said frame at the exit end of said gate aperture to complete the projection.

9. The method of projecting motion pictures which comprises continuously advancing a film having a series of picture image frames thereon through a curved gate having an aperture longer than the distance between successive picture image frame centers, projecting a plurality of spaced beams of light, each of which is shorter than said frames, successively through successive frames of said series and through said aperture to project an elemental part of the film image while rotating said beams of light on an axis concentric with the axis of curvature of the film in the gate at an angular velocity greater than the angular velocity of the film in the gate to cause successive beams of light to scan successive frames, the angular distance between successive beams of light being equal to the angular distance between successive frame centers multiplied by the ratio of the angular velocity of said beams of light to the angular velocity of the film in the gate.

10. The method of projecting motion pictures which comprises continuously advancing a film having a series of picture image frames thereon through a curved gate having an aperture longer than the distance between successive picture image frame centers, projecting a beam of light which is shorter than said frame through said film and aperture to project an elemental part of the film image, and rotating an optical lens system on an axis coinciding with the axis of curvature of said gate at an angular velocity greater than the angular velocity of the film in the gate to focus the projected image on the screen, said optical lens system being aligned with the trailing end of a frame at the entrance end of said gate aperture to begin projection of said frame, and being aligned with the advancing end of said frame at the exit end of said gate aperture to complete the projection.

FRED WALLER.
WILLIS ROBERT DRESSER.